United States Patent
Talebi Esfandarani et al.

(10) Patent No.: US 9,420,302 B2
(45) Date of Patent: Aug. 16, 2016

(54) WEIGHTED MULTI-BAND CROSS COLOR CHANNEL PREDICTOR

(71) Applicant: DOLBY LABORATORIES LICENSING CORPORATION, San Francisco, CA (US)

(72) Inventors: Hossein Talebi Esfandarani, Santa Cruz, CA (US); Guan-Ming Su, Fremont, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 135 days.

(21) Appl. No.: 14/563,279

(22) Filed: Dec. 8, 2014

(65) Prior Publication Data

US 2015/0092850 A1    Apr. 2, 2015

Related U.S. Application Data

(63) Continuation-in-part of application No. 14/370,674, filed as application No. PCT/US2013/022673 on Jan. 23, 2013, now Pat. No. 8,971,408.

(60) Provisional application No. 61/590,175, filed on Jan. 24, 2012.

(51) Int. Cl.

| H04N 7/12 | (2006.01) |
|---|---|
| G06K 9/36 | (2006.01) |
| H04N 19/44 | (2014.01) |
| H04N 19/503 | (2014.01) |
| H04N 19/105 | (2014.01) |
| H04N 19/14 | (2014.01) |

(Continued)

(52) U.S. Cl.
CPC ............. *H04N 19/44* (2014.11); *H04N 19/105* (2014.11); *H04N 19/14* (2014.11); *H04N 19/154* (2014.11); *H04N 19/182* (2014.11); *H04N 19/186* (2014.11); *H04N 19/33* (2014.11); *H04N 19/503* (2014.11)

(58) Field of Classification Search
CPC ...... H04N 19/503; H04N 19/14; H04N 19/44
See application file for complete search history.

(56) References Cited

U.S. PATENT DOCUMENTS

| 8,406,569 B2 | 3/2013 | Segall |
|---|---|---|
| 8,457,203 B2 | 6/2013 | Bossen |

(Continued)

FOREIGN PATENT DOCUMENTS

| WO | 2008/128898 | 10/2008 |
|---|---|---|
| WO | 2010/105036 | 9/2010 |

OTHER PUBLICATIONS

Garbas, J-U, et al "Inter-Layer Prediction for Backwards Compatible High Dynamic Range Video Coding with SVC" IEEE Picture Coding Symposium, May 7-9, 2012, pp. 285-288.

(Continued)

*Primary Examiner* — Dave Czekaj
*Assistant Examiner* — Tsion B Owens
(74) *Attorney, Agent, or Firm* — Konstantinos Konstantinides

(57) ABSTRACT

A sequence of visual dynamic range (VDR) images is encoded using a standard dynamic range (SDR) base layer and one or more enhancement layers. A predicted VDR image is generated from an SDR input by using a weighted, multi-band, cross-color channel prediction model. Exponential weights with an adaptable decay parameter for each band are also presented.

22 Claims, 5 Drawing Sheets

(51) Int. Cl.
*H04N 19/186* (2014.01)
*H04N 19/154* (2014.01)
*H04N 19/182* (2014.01)
*H04N 19/33* (2014.01)

(56) References Cited

U.S. PATENT DOCUMENTS

| | | | |
|---|---|---|---|
| 8,498,336 B2 | 7/2013 | Tourapis | |
| 8,611,421 B1 | 12/2013 | Efremov | |
| 8,811,490 B2 | 8/2014 | Su | |
| 8,897,581 B2 | 11/2014 | Su | |
| 8,989,267 B2* | 3/2015 | Efremov | H04N 19/136 375/240.12 |
| 2003/0123072 A1 | 7/2003 | Spronk | |
| 2005/0259729 A1 | 11/2005 | Sun | |
| 2008/0175495 A1 | 7/2008 | Segall | |
| 2011/0194618 A1* | 8/2011 | Gish | G06T 5/50 375/240.25 |
| 2012/0230405 A1 | 9/2012 | An | |
| 2013/0011059 A1* | 1/2013 | Strom | G06T 9/00 382/166 |
| 2013/0108183 A1 | 5/2013 | Bruls | |
| 2013/0148029 A1 | 6/2013 | Gish | |
| 2013/0163666 A1 | 6/2013 | Leontaris | |
| 2013/0223531 A1 | 8/2013 | Garbas | |
| 2014/0072041 A1* | 3/2014 | Seregin | H04N 19/00569 375/240.13 |
| 2014/0098869 A1 | 4/2014 | Su | |
| 2014/0241418 A1* | 8/2014 | Garbas | H04N 19/00042 375/240.02 |

OTHER PUBLICATIONS

Winken, M. et al "CE2: SVC Bit-Depth Scalable Coding" JVT Meeting; Joint Video Team of ISO/IEC JTC1/SC29 WG11 and ITU-T SG.16, 24th meeting: Geneva, CH, Jun. 29-Jul. 5, 2007.

Mai, Z. et al "Optimizing a Tone Curve for Backward-Compatible High Dynamic Range Image and Video Compression" IEEE Transactions on Image Processing, vol. 20, No. 6, Jun. 1, 2011, pp. 1558-1571.

Ford, A. et al. "Colour Space Conversions" Internet Citation, Aug. 11, 1998, retrieved from the Internet.

* cited by examiner

WEIGHTED MULTI-BAND CROSS COLOR CHANNEL PREDICTOR

CROSS-REFERENCE TO RELATED APPLICATIONS

This application is a Continuation in Part (CIP) of U.S. patent application Ser. No. 14/370,674, filed on Jul. 3, 2014, which is the national stage entry for PCT Application Ser. No. PCT/US2013/022673, filed on Jan. 23, 2013, which claims the benefit of priority to U.S. Provisional Patent Application Ser. No. 61/590,175, filed on Jan. 24, 2012, each of which is incorporated herein by reference in its entirety. The present disclosure may also be related to U.S. Pat. No. 8,811,490, titled "Multiple color channel multiple regression predictor," which is incorporated herein by reference in its entirety.

TECHNOLOGY

The present invention relates generally to images. More particularly, an embodiment of the present invention relates to a weighted multi-band cross color channel predictor of high dynamic range images using standard dynamic range images.

BACKGROUND

As used herein, the term 'dynamic range' (DR) may relate to a capability of the human psychovisual system (HVS) to perceive a range of intensity (e.g., luminance, luma) in an image, e.g., from darkest darks to brightest brights. In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the human visual system (HVS). For example, well adapted humans with essentially normal vision (e.g., in one or more of a statistical, biometric or ophthalmological sense) have an intensity range that spans about 15 orders of magnitude. Adapted humans may perceive dim light sources of as few as a mere handful of photons. Yet, these same humans may perceive the near painfully brilliant intensity of the noonday sun in desert, sea or snow (or even glance into the sun, however briefly to prevent damage). This span though is available to 'adapted' humans, e.g., those whose HVS has a time period in which to reset and adjust.

In contrast, the DR over which a human may simultaneously perceive an extensive breadth in intensity range may be somewhat truncated, in relation to HDR. As used herein, the terms 'visual dynamic range' or 'variable dynamic range' (VDR) may individually or interchangeably relate to the DR that is simultaneously perceivable by a HVS. As used herein, VDR may relate to a DR that spans 5-6 orders of magnitude. Thus while perhaps somewhat narrower in relation to true scene referred HDR, VDR nonetheless represents a wide DR breadth. As used herein, the term 'simultaneous dynamic range' may relate to VDR.

Until fairly recently, displays have had a significantly narrower DR than HDR or VDR. Television (TV) and computer monitor apparatus that use typical cathode ray tube (CRT), liquid crystal display (LCD) with constant fluorescent white back lighting or plasma screen technology may be constrained in their DR rendering capability to approximately three orders of magnitude. Such conventional displays thus typify a low dynamic range (LDR), also referred to as a standard dynamic range (SDR), in relation to VDR and HDR.

Advances in their underlying technology however allow more modern display designs to render image and video content with significant improvements in various quality characteristics over the same content, as rendered on less modern displays. For example, more modern display devices may be capable of rendering high definition (HD) content and/or content that may be scaled according to various display capabilities such as an image scaler. Moreover, some more modern displays are capable of rendering content with a DR that is higher than the SDR of conventional displays.

For example, some modern LCD displays have a backlight unit (BLU) that comprises a light emitting diode (LED) array. The LEDs of the BLU array may be modulated separately from modulation of the polarization states of the active LCD elements. This dual modulation approach is extensible (e.g., to N-modulation layers wherein N comprises an integer greater than two), such as with controllable intervening layers between the BLU array and the LCD screen elements. Their LED array based BLUs and dual (or N-) modulation effectively increases the display referred DR of LCD monitors that have such features.

Such "HDR displays" as they are often called (although actually, their capabilities may more closely approximate the range of VDR) and the DR extension of which they are capable, in relation to conventional SDR displays represent a significant advance in the ability to display images, video content and other visual information. The color gamut that such an HDR display may render may also significantly exceed the color gamut of more conventional displays, even to the point of capably rendering a wide color gamut (WCG). Scene related HDR or VDR and WCG image content, such as may be generated by "next generation" movie and TV cameras, may now be more faithfully and effectively displayed with the "HDR" displays (hereinafter referred to as 'HDR displays').

As with the scalable video coding and HDTV technologies, extending image DR typically involves a bifurcate approach. For example, scene referred HDR content that is captured with a modern HDR capable camera may be used to generate an SDR version of the content, which may be displayed on conventional SDR displays. In one approach, generating the SDR version from the captured VDR version may involve applying a global tone mapping operator (TMO) to intensity (e.g., luminance, luma) related pixel values in the HDR content. In a second approach, as described in Patent Application PCT/US2011/048861 "Extending Image Dynamic Range", by W. Gish et al., herein incorporated by reference for all purposes, generating an SDR image may involve applying an invertible operator (or predictor) on the VDR data. To conserve bandwidth or for other considerations, transmission of both of the actual captured VDR content and a corresponding SDR version may not be a best approach.

Thus, an inverse tone mapping operator (iTMO), inverted in relation to the original TMO, or an inverse operator in relation to the original predictor, may be applied to the SDR content version that was generated, which allows a version of the VDR content to be predicted. The predicted VDR content version may be compared to originally captured HDR content. For example, subtracting the predicted VDR version from the original VDR version may generate a residual image. An encoder may send the generated SDR content as a base layer (BL), and package the generated SDR content version, any residual image, and the iTMO or other predictors as an enhancement layer (EL) or as metadata.

Sending the EL and metadata, with its SDR content, residual and predictors, in a bitstream typically consumes less bandwidth than would be consumed in sending both the HDR and SDR contents directly into the bitstream. Compatible decoders that receive the bitstream sent by the encoder may decode and render the SDR on conventional displays. Compatible decoders however may also use the residual image, the iTMO predictors, or the metadata to compute a predicted version of the HDR content therefrom, for use on more capable displays. It is the purpose of this invention to provide novel methods for generating predictors that allow for the efficient coding, transmission, and decoding of VDR data using corresponding SDR data.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Cross-color channel prediction for layered coding and decoding is described herein. Given a pair of corresponding VDR and SDR images, that is, images that represent the same scene but at different levels of dynamic range, this section describes methods that allow an encoder to approximate the VDR image in terms of the SDR image using either a piecewise cross-color channel (PCCC) predictor or a multivariate, locally weighted (MLW) predictor. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to coding images with high dynamic range. In one embodiment, a sequence of visual dynamic range (VDR) images may be encoded using a standard dynamic range (SDR) base layer and one or more enhancement layers. A prediction image is generated by using a multivariate locally weighted (MLW) prediction model, where a color channel in the SDR input is weighted and predicted across multiple bands and each band is assigned its own cross-color channel predictor to output a band-based predicted VDR image. After computing prediction weights for each band of the MLW model, the MLW prediction model parameters are determined and band-based predicted outputs are computed. A final output predicted image is computed based on a weighted blending of the band-based predicted outputs using the prediction weights.

In another embodiment, a decoder accesses a base SDR layer, a residual layer, and metadata related to MLW prediction modeling. After generating prediction weights, the decoder generates band-based predicted image outputs using the base layer, the prediction weights, and the MLW prediction parameter. A final output predicted image is computed based on a weighted blending of the band-based predicted outputs, which may be used together with the residual layer to generate an output VDR image.

Example VDR-SDR System

Figure 1:
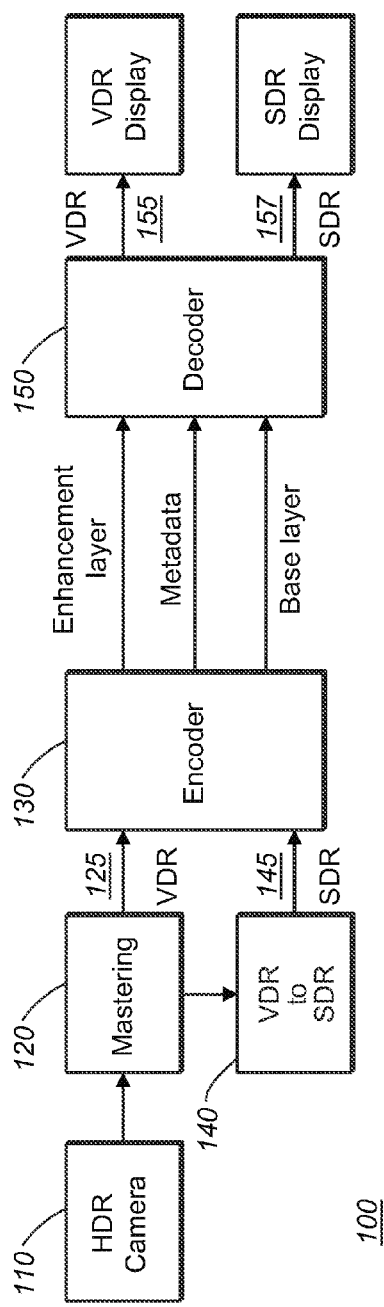
FIG. 1 depicts an example data flow for a VDR-SDR system, according to an embodiment of the present invention.

FIG. 1 depicts an example data flow in a VDR-SDR system 100, according to an embodiment of the present invention. An HDR image or video sequence is captured using HDR camera 110 or other similar means. Following capture, the captured image or video is processed by a mastering process to create a target VDR image 125. The mastering process may incorporate a variety of processing steps, such as: editing, primary and secondary color correction, color transformation, and noise filtering. The VDR output 125 of this process typically represents the director's intent on how the captured image will be displayed on a target VDR display.

The mastering process may also output a corresponding SDR image 145, representing the director's intent on how the captured image will be displayed on a legacy SDR display. The SDR output 145 may be provided directly from mastering circuit 120 or it may be generated with a separate VDR-to-SDR converter 140.

In this example embodiment, the VDR 125 and SDR 145 signals are input into an encoder 130. Purpose of encoder 130 is to create a coded bitstream that reduces the bandwidth required to transmit the VDR and SDR signals, but also allows a corresponding decoder 150 to decode and render either the SDR or VDR signals. In an example implementation, encoder 130 may be a layered encoder, such as one of those defined by the MPEG-2 and H.264 coding standards, which represents its output as a base layer, an optional enhancement layer, and metadata. As used herein, the term "metadata" relates to any auxiliary information that is transmitted as part of the coded bitstream and assists a decoder to render a decoded image. Such metadata may include, but are not limited to, such data as: color space or gamut information, dynamic range information, tone mapping information, or predictor operators, such as those described herein.

On the receiver, a decoder 150 uses the received coded bitstreams and metadata to render either an SDR image 157 or a VDR image 155, according to the capabilities of the target display. For example, an SDR display may use only the base layer and the metadata to render an SDR image. In contrast, a VDR display may use information from all input layers and the metadata to render a VDR signal.

Figure 2:
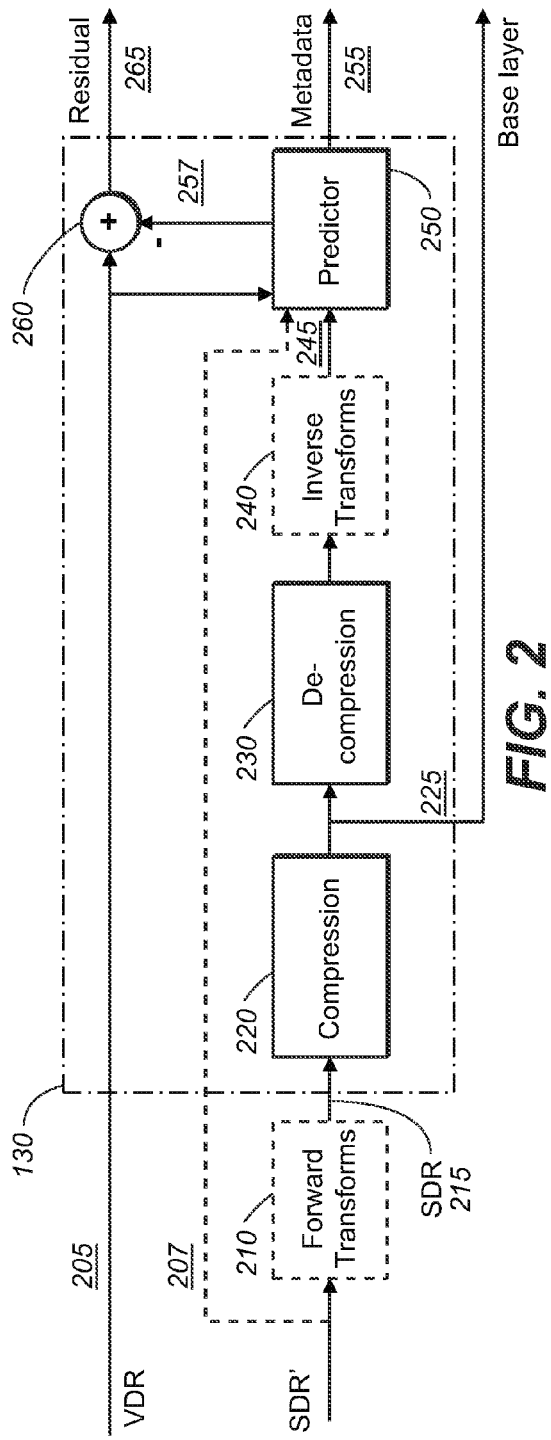
FIG. 2 depicts an example VDR encoding system according to an embodiment of the present invention.

FIG. 2 shows in more detail an example implementation of encoder 130 incorporating the methods of this invention. In FIG. 2, optional SDR' 207 signal denotes an enhanced SDR signal. Typically, SDR video today is 8-bit, 4:2:0, ITU Rec. 709 data. SDR' may have the same color space (primaries and white point) as SDR, but may use high precision, say 12-bits per pixel, with all color components at full spatial resolution (e.g., 4:4:4 RGB). From FIG. 2, SDR can be derived from an SDR' signal using a set of forward transforms that may include quantization from say 12 bits per pixel to 8 bits per pixel, color transformation, say from RGB to YUV, and color subsampling, say from 4:4:4 to 4:2:0. The SDR output of converter 210 is applied to compression system 220. Depending on the application, compression system 220 can be either lossy, such as H.264 or MPEG-2, or lossless, such as JPEG2000. The output of the compression system 220 may be transmitted as a base layer 225. To reduce drift between the encoded and decoded signals, it is not uncommon for encoder 130 to follow compression process 220 with a corresponding decompression process 230 and inverse transforms 240, corresponding to the forward transforms of 210. Thus, predictor 250 may have the following inputs: VDR input 205 and either the compressed-decompressed SDR' (or SDR) signal 245, which corresponds to the SDR' (or SDR) signal as it will be received by a corresponding decoder 150, or original input SDR' 207. Predictor 250, using input VDR and SDR' (or SDR) data will create signal 257 which represents an approximation or estimate of input VDR 205. Adder 260 subtracts the predicted VDR 257 from the original VDR 205 to form output residual signal 265. Subsequently (not shown), residual 265 may also be coded by another lossy or lossless encoder, and may be transmitted to the decoder as an enhancement layer. In some embodiments, compression unit 220 may receive directly an SDR input 215. In such embodiments, forward transforms 210 and inverse transforms 240 units may be optional.

Predictor 250 may also provide the prediction parameters being used in the prediction process as metadata 255. Since prediction parameters may change during the encoding process, for example, on a frame by frame basis, or on a scene by scene basis, these metadata may be transmitted to the decoder as part of the data that also include the base layer and the enhancement layer.

Since both VDR 205 and SDR' 207 (or SDR 215) represent the same scene, but are targeting different displays with different characteristics, such as dynamic range and color gamut, it is expected that there is a very close correlation between these two signals. In co-owned U.S. Provisional Application Ser. No. 61/475,359, filed on Apr. 14, 2011, (now U.S. Pat. No. 8,811,490) titled "Multiple color channel multiple regression predictor," from now on denoted as the '359 application, incorporated herein by reference in its entirety, a novel multivariate, multi-regression (MMR) prediction model was disclosed which allowed the input VDR signal to be predicted using its corresponding SDR' (or SDR) signal and a MMR operator.

The MMR predictor of the '359 application may be considered a "global" cross-color predictor since it may be applied to all pixels of a frame, regardless of their individual color values. However, when translating a VDR video sequence to an SDR video sequence there are several operating factors that may degrade the efficiency of global predictors, such as color clipping and secondary color grading.

Under color clipping, values of some pixels in one channel or color component (e.g., the Red channel) may be clipped more severely than the values of the same pixels in other channels (say, the Green or Blue channels). Since clipping operations are non-linear operations, the predicted values of these pixels may not follow the global mapping assumptions, thus yielding large prediction errors.

Another factor that may affect SDR to VDR prediction is secondary color grading. In secondary color grading, the colorist may further partition each color channel into segments, such as: highlights, mid-tones, and shadows. These color boundaries may be controlled and customized during the color grading process. Estimating these color boundaries may improve overall prediction and reduce color artifacts in the decoded video.

Example Prediction Models

Example Notation and Nomenclature

Without loss of generality, an embodiment is considered of a piecewise cross-color channel (PCCC) predictor with two inputs: an SDR (or SDR') input s and a VDR input v. Each of these inputs comprises multiple color channels, also commonly referred to as color components, (e.g., RGB, YCbCr, XYZ, and the like). Without loss of generality, regardless of bit depth, pixel values across each color component may be normalized to [0,1).

Assuming all inputs and outputs are expressed using three color components, denote the three color components of the i-th pixel in the SDR image as $$s_i = [s_{i1} s_{i2} s_{i3}], \quad (1)$$

denote the three color components of the i-th pixel in the VDR input as $$v_i = [v_{i1} v_{i2} v_{i3}], \text{and} \quad (2)$$

denote the predicted three color components of the i-th pixel in predicted VDR as $$\hat{v}_i = [\hat{v}_{i1} \hat{v}_{i2} \hat{v}_{i3}]. \quad (3)$$

Each color channel, say the c-th, may be sub-divided into a set of multiple, non-overlapping, color segments using a set of boundary points (e.g., $u_{c1}, u_{c2}, \ldots, u_{cU}$), so that within two successive segments (e.g., u and u+1) $0 \le u_{cu} < u_{c(u+1)} < 1$. For example, in an embodiment, each color channel may be sub-divided into three segments representing shadows, midtones, and highlights, using two boundary points, $u_{c1}$ and $u_{c2}$. Then, shadows will be defined in the range $[0, u_{c1})$, midtones will be defined in the range $[u_{c1}, u_{c2})$, and highlights will be defined in the range $[u_{c2}, 1)$.

Denote the set of the pixels having values within the u-th segment in the c-th color channel as $\Phi_c^u$. Denote $p_c^u$ as the number of pixels in $\Phi_c^u$. To facilitate the discussion and simplify the notation, the procedure is described for the u-th segment in the c-th color channel and can be repeated for all segments in all color channels. The proposed PCCC modeling may be combined with other cross-color-based models, as those described in the '359 application. As an example, and without loss of generality, a second-order PCCC model is described; however, the methods can easily be extended to other prediction models as well.

Example Second-Order PCCC Model

Prediction Optimization for a Segment of a Color Channel

For the SDR signal, denote the three color components of the i-th pixel in $\Phi_c^u$ as $$s_{ci}^u = [s_{i1} s_{i2} s_{i3}]. \quad (4)$$

For each SDR pixel in $\Phi_c^u$, one can find the corresponding co-located VDR pixel, denoted as $$v_{ci}^u = [V_{ic}]. \quad (5)$$

As used herein, the term 'corresponding co-located SDR and VDR pixels' denotes two pixels, one in the SDR image and one in the VDR image, that may have different dynamic ranges, but have the same pixel coordinates within each image. For example, for an SDR pixel s(10,20), the corresponding co-located VDR pixel is v(10,20).

Denote the predicted value of the c-th color component for this VDR pixel as $$\hat{v}_{ci}^u = [\hat{v}_{ic}]. \quad (6)$$

By collecting all $p_c^u$ pixels in $\Phi_c^u$ together, one may generate the following vector expressions $$\hat{V}_c^u = \begin{bmatrix} \hat{v}_{c0}^u \\ \hat{v}_{c1}^u \\ \vdots \\ \hat{v}_{cp_c^u-1}^u \end{bmatrix},$$

$$S_c^u = \begin{bmatrix} s_{c0}^u \\ s_{c1}^u \\ \vdots \\ s_{cp_c^u-1}^u \end{bmatrix},$$

and the original VDR data $$V_c^u = \begin{bmatrix} v_{c0}^u \\ v_{c1}^u \\ \vdots \\ v_{cp_c^u-1}^u \end{bmatrix}. \quad (7)$$

Given the input SDR s signal, one may define a prediction model comprising first order and second (or higher) order SDR input data, such as:

$$sc_{ci}^u = [s_{i1} \cdot s_{i2} s_{i1} \cdot s_{i3} s_{i2} \cdot s_{i3} s_{i1} \cdot s_{i2} \cdot s_{i3}], \quad (8)$$

$$s_{ci}^{u2} = [s_{i1}^2 s_{i2}^2 s_{i3}^2], \text{and} \quad (9)$$

$$sc_{ci}^{u2} = [s_{i1}^2 \cdot s_{i2}^2 s_{i1}^2 \cdot s_{i3}^2 s_{i2}^2 \cdot s_{i3}^2 s_{i1}^2 \cdot s_{i2}^2 \cdot s_{i3}^2]. \quad (10)$$

These data vectors may be combined to form the input vector for a second-order PCCC model:

$$s_{ci}^{u(2)} = [1 s_{ci}^u sc_{ci}^u s_{ci}^{u2} sc_{ci}^{u2}]. \quad (11)$$

Given equations (4) to (11), the VDR prediction problem may be expressed as $$\hat{v}_{ci}^u = s_{ci}^{u(2)} M_c^u, \quad (12)$$

where $M_c^u$ denotes a prediction parameter matrix for the u-th segment within the c-th color component. Note that this is a cross-color channel prediction model. In equation (12), the c-th color component of the predicted output is expressed as a combination of all color components in the input. In other words, unlike other single-channel color predictors, where each color channel is processed on its own and independently of each other, this model may take into consideration all color components of a pixel and thus may take full advantage of any inter-color correlation and redundancy.

By collecting all $p_c^u$ pixels together, one may form the corresponding data matrix $$SC_c^{u(2)} = \begin{bmatrix} s_{c0}^{u(2)} \\ s_{c1}^{u(2)} \\ \vdots \\ s_{cp_c^u-1}^{u(2)} \end{bmatrix}. \quad (13)$$

Then, the prediction operation may be expressed in matrix form as $$\hat{V}_c^u = SC_c^{u(2)} \cdot M_c^u. \quad (14)$$

In one embodiment, a solution predictor $M_c^u$, may be obtained using least square error optimization techniques, where the elements of $M_c^u$ are selected so that they minimize the mean square error (MSE) between the original VDR and the predicted VDR $$\min_{M_c^u} \| V_c^u - \hat{V}_c^u \|^2. \quad (15)$$

Under the MSE criterion, an optimum solution to equation (15) may be expressed as $$M_c^u = (SC_c^{u(2)T} SC_c^{u(2)})^{-1} SC_c^{u(2)T} V_c^u. \quad (16)$$

The above formulation derives a predictor for a specific segment within one of the color channels, assuming the boundaries of these segments within a color channel are known. However, in practice, the specific boundary points of each channel segment may not be available and may need to be derived during the encoding process.

Figure 3:
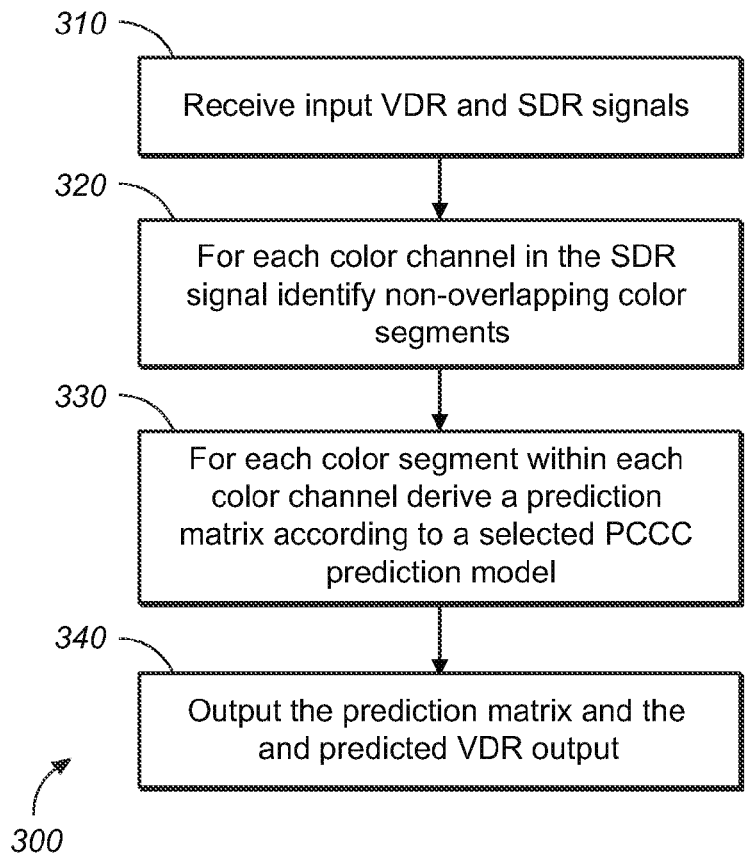
FIG. 3 depicts an example piecewise cross-color channel prediction process according to an embodiment of the present invention.

FIG. 3 depicts an example prediction process according to an embodiment of this invention. In step 310, a predictor accesses input VDR and SDR signals. In step 320, each color channel in the input SDR signal may be segmented into two or more non-overlapping segments. The boundaries of these segments may be received as part of the input data, say from the VDR to SDR color grading process, or they may be determined from the input data using techniques as those to be described in the next Section. In step 330, for each color segment in each of the color channels, using a cross-color prediction model, for example the second-order PCCC model of equations (4) to (14), and an optimization criterion, such as minimizing the prediction MSE, a prediction parameter matrix (e.g., $M_c^u$) is determined. In step 340, a predicted VDR output is computed. In addition to computing a predicted VDR image, the prediction parameter matrix may be communicated to a decoder using ancillary data, such as metadata.

Prediction Optimization for the Whole Color Channel

Consider the problem of optimizing the prediction for all pixels across all segments within the c-th color channel. For all p pixels within this channel, denote the predicted VDR as $$\hat{V}_c = \begin{bmatrix} \hat{v}_{c0} \\ \hat{v}_{c1} \\ \vdots \\ \hat{v}_{cp-1} \end{bmatrix}, \quad (17)$$

and denote the original VDR data $$V_c = \begin{bmatrix} v_{c0} \\ v_{c1} \\ \vdots \\ v_{cp-1} \end{bmatrix}, \quad (18)$$

The optimization problem for the c-th color channel may be formulated as a MSE minimization problem to find $$\min \|V_c - \hat{V}_c\|^2. \quad (19)$$

Given a set of boundary points $u_{ci}$, the whole-channel parameter optimization problem can be decomposed into several sub-problems, one for each segment of the c-th color channel, and a solution for each sub-problem can be derived using equation (16). More specifically, given a set of U color segments, equation (19) can be expressed as $$\min \|V_c - \hat{V}_c\|^2 = \min_{\{M_c^u\}} \sum_{u=1}^{U} \|V_c^u - \hat{V}_c^u(M_c^u)\|^2. \quad (20)$$

Let $$\{\hat{M}_c^u\} = \underset{\{M_c^u\}}{\operatorname{argmin}} \sum_{u=1}^{U} \|V_c^u - \hat{V}_c^u(M_c^u)\|^2. \quad (21)$$

Given a set of boundary points $u_{ci}$, the total distortion for a set of prediction parameters may be given by:

$$J(\{u_{ci}\}) = \sum_{u=1}^{U} \|V_c^u - \hat{V}_c^u(\hat{M}_c^u)\|^2. \quad (22)$$

When the value of any of the boundary point changes, the above overall distortion changes, too. Therefore, the goal is to identify those boundary points for which the overall distortion in the c-th channel is minimized $$\min_{\{u_{ci}\}} J(\{u_{ci}\}). \quad (23)$$

Example Solutions

Color Channel with Only Two Segments

As most SDR content is normally limited to 8 bits, if one excludes the values 0 and 255, the total number of boundary points is limited to $2^8 - 2 = 254$. If a color channel comprises only two color segments, then one needs to identify a single boundary ($u_{c1}$) within the range [1, 255]. In one embodiment, a full search may compute $J(\{u_{c1}\})$ for all possible 254 boundaries points and then select as boundary point $u_{c1}$ the boundary point for which $J(\{u_{c1}\})$ is minimum.

In another embodiment, one may derive the best boundary point using a heuristic, iterative, search technique that may expedite the search time but may not necessarily yield optimal boundary values. For example, in one embodiment, the original SDR range may be subdivided into K segments (e.g., K=8). Then, assuming the boundary $u_{c1}$ is approximately in the middle of each of these segments, one may compute equation (22) K times. Let $k_c$ denote the segment with the minimum prediction error among all K segments. Then within the $k_c$ segment, one can perform either full search or similar hierarchical searches to identify a locally optimum boundary point. The steps of this two-step search algorithm are summarized in pseudo-code in Table 1.

TABLE 1

Two-step Search Algorithm

Divide color space range into K segments
//First Step
(a) For each segment k, compute the prediction error $J_k(\{u_{c1}\})$ assuming the boundary point $u_{c1}$ is located approximately in the middle of the k-th segment
(b) Determine the segment, say $k_c$, for which $J_k(\{u_{c1}\})$ is minimum
//Second step
(a) Within the $k_c$ segment, use full search or repeat this two-step algorithm to find $u_{c1}$ that minimizes the prediction error This two-step search algorithm can easily be modified for alternative embodiments. For example, instead of assuming that the boundary point is located approximately in the middle of the k-th segment, one may assume that the boundary point is located at the beginning, the end, or any other position of the segment.

For color spaces with more than two segments, similar heuristic and iterative search techniques may also be applied. For example, for 8-bit SDR data, after identifying the first boundary point $u_{c1}$ in the range (1,255), one may try to identify two candidates for a second boundary point: one candidate in the sub-ranges (0, $u_{c1}$) and the other in the sub-range ($u_{c1}$, 255). By computing the overall distortion J ($\{u_{ci}\}$) for each of these two candidates, then one can define the second boundary point ($u_{c2}$) as the one that yields the smallest prediction error (e.g., using equation (22)) among the two candidate solutions.

Since color grading of video frames is highly correlated, especially for all the frames within the same scene, the search of boundary points for the n-th frame may also take into consideration known results from prior frames within the same scene. Alternatively, boundary points may be computed only once for the whole scene. An example of a scene-based search algorithm is described in pseudo code in Table 2. In this embodiment, after identifying a boundary point for the first frame using the full dynamic range of a color channel, subsequent frames use it as a starting point to define a boundary point within a far smaller segment of the color space.

TABLE 2

Scene-based Search Algorithm

For the first frame in one scene
(1) perform a two-step algorithm to identify a boundary point within a color channel
For the rest of the frames in the same scene
(2) use the boundary point from the previous frame to define a segment to be used as the starting point of the second step in the two-step search (see Table 1).

It should be appreciated that the steps of this algorithm may be implemented in a variety of alternative ways. For example, in the (1) step, instead of using a two-step search algorithm to identify a boundary point, one may use full-search, or any other type of search algorithm. As another example, in the (2) step, given a starting point, that starting point can be considered the approximately middle point of a segment of a predefined length. Alternatively, it can be considered the starting point of a segment, the end point of a segment, or any predefined position in a segment.

The methodology described herein may also be applied in deriving other PCCC models. For example, a first-order PCCC model can be derived by utilizing only the first three terms of equation (11), using equations $$s_{ci}^{u(1)} = [1 \, s_{ci}^u \, sc_{ci}^u], \tag{24}$$

and $$\hat{v}_{ci}^u = s_{ci}^{u(1)} M_c^u. \tag{25}$$

Similarly, the data vectors in equations (8)-(11) can be extended to define third-order or higher-order PCCC models.

Image Decoding

Figure 4:
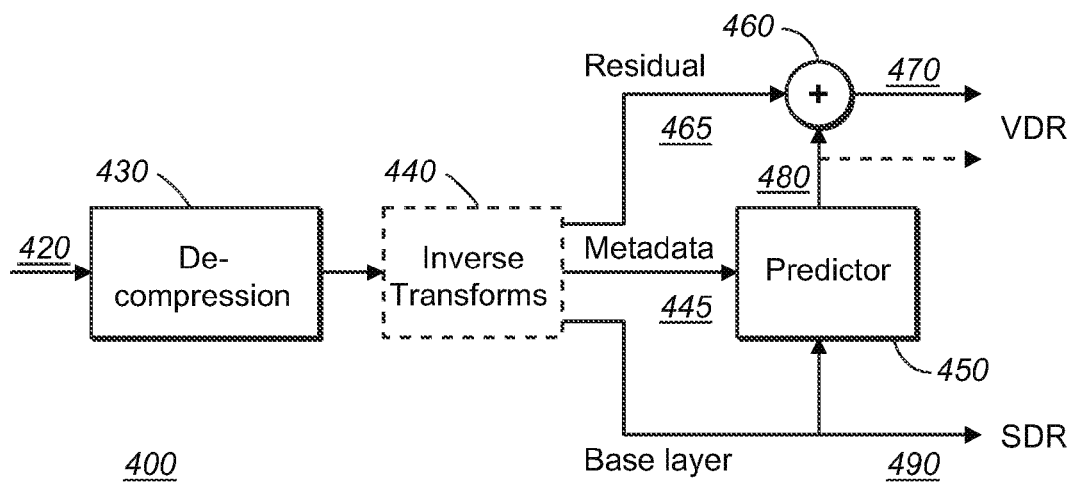
FIG. 4 depicts an example image decoder with a predictor operating according to embodiments of this invention.

Embodiments of the present invention may be implemented either on an image encoder or an image decoder. FIG. 4 shows an example implementation of decoder 150 according to an embodiment of this invention.

Decoding system 400 receives a coded bitstream that may combine a base layer 490, an optional enhancement layer (or residual) 465, and metadata 445, which are extracted following decompression 430 and miscellaneous optional inverse transforms 440. For example, in a VDR-SDR system, the base layer 490 may represent the SDR representation of the coded signal and the metadata 445 may include information about the PCCC prediction model that was used in the encoder predictor 250 and the corresponding prediction parameters. In one example implementation, when the encoder uses a PCCC predictor according to the methods of this invention, metadata may include the boundary values that identify each color segment within each color channel, identification of the model being used (e.g., first order PCCC, second order PCCC, and the like), and all coefficients of the prediction parameter matrix associated with that specific model. Given base layer 490 s and the prediction parameters extracted from the metadata 445, predictor 450 can compute predicted $\hat{v}$ 480 using any of the corresponding equations described herein (e.g., equation (14)). If there is no residual, or the residual is negligible, the predicted value 480 can be outputted directly as the final VDR image. Otherwise, in adder 460, the output of the predictor (480) is added to the residual 465 to output VDR signal 470.

Weighted Multi-Band Prediction

Piecewise cross-color channel prediction outperforms the original MMR model of the '359 application; however, one may still observe various coding artifacts at the boundaries of the prediction segments. This may be due to the fact that each predictor uses its own set of pixels to solve for the optimal prediction coefficients within each segment, without taking into consideration boundary conditions. Pixels across a boundary of a prediction segment are predicted using two separate sets of prediction coefficients. If there are significant differences between the two sets of prediction coefficients, then coding artifacts may occur. In another embodiment, such artifacts may be reduced or eliminated by appropriate blending of band-based predicted data, where each pixel band (e.g., darks, mid-tones, and highlights) is defined through a prediction weight function.

Multivariate Locally Weighted (MLW) Prediction

Assume there are total P pixels in the current image or video frame (125, 145). Assuming three color components per pixel, let the i-th pixel in the VDR image or frame (125) be denoted as $v_i = [v_{i0} \, v_{i1} \, v_{i2}]$ and let a co-located pixel in the SDR image or frame (145) be denoted as $s_i = [s_{i0} \, s_{i1} \, s_{i2}]$. For each color channel c (e.g., Y, Cb, Cr, or R, G, B, and the like), for each image or frame, all VDR and SDR pixel values may be denoted as vectors $$v_c = \begin{bmatrix} v_{0,c} \\ v_{1,c} \\ \vdots \\ v_{P-2,c} \\ v_{P-1,c} \end{bmatrix} \tag{26}$$

and $$s_c = \begin{bmatrix} s_{0,c} \\ s_{1,c} \\ \vdots \\ s_{P-2,c} \\ s_{P-1,c} \end{bmatrix}.$$

The prediction problem, may be expressed as trying to solve $$\hat{v}_c = S m_c, \tag{27}$$

where $m_c$ denotes an n×1 prediction parameter vector, S denotes a P×n data observation matrix that depends on the prediction model under consideration, and $\hat{v}_c$ denotes a P×1 vector of the predicted VDR pixel data. For example, without loss of generality, in a first order MMR model, S may be expressed as $$S = [1 \, s_0 \, s_1 \, s_2 \, s_0 s_1 \, s_0 s_2 \, s_1 s_2 \, s_0 s_1 s_2]. \tag{28}$$

Alternatively, as an example, using equations (27) and (28), for three color channels, the first-order MMR predictor may be expressed as $$\hat{v}_{i,c} = m_{0,c} + m_{1,c} s_{i,0} + m_{2,c} s_{i,1} + m_{3,c} s_{i,2} + \ldots + m_{6,c} s_{i,1} s_{i,2} + m_{7,c} s_{i,0} s_{i,1} s_{i,2}.$$

A person with ordinary skill in the art would appreciate that S may be mapped to a variety of prediction linear and non-linear models known in the art, including those described by equation (11) or in the '359 application.

Given equation (27), in the least squares sense, an optimal MMR solution may be expressed as $$m_c = (S^T S)^{-1} (S^T v_c). \tag{29}$$

Under an alternative multivariate, locally-weighted (MLW) prediction model (see for example, D. Ruppert et al., "*Multivariate locally weighted least squares regression*," The Annals of Statistics, pp. 1346-1370, 1994, which is incorporated herein by reference in its entirety), each color component can be further divided into U bands (e.g., U=2 or 3) and a separate predictor may be designed for each band. As used herein, the term "band" denotes a range of continuous pixel values within a color channel. Such bands may be overlapping. For example, a color channel may be loosely divided into darks, mid-tones, and highlights. A band may include the full pixel range of a color channel, but with special emphasis to pixel values within a subset of that range. In an embodiment, given a solution for the u-th band expressed as $$m_c^u = \min_{m_c} \, (v_c - S m_c)^T W_c^u (v_c - S m_c), \tag{30}$$

the predicted VDR values for each band may be expressed as $$\hat{v}_c^u = S m_c^u, \tag{31}$$

where $W_c^u$ is a diagonal matrix containing positive prediction weights and has the following form $$W_c^u = \begin{bmatrix} w_{0,c}^u & \cdots & 0 \\ \vdots & \ddots & \vdots \\ 0 & \cdots & w_{(P-1),c}^u \end{bmatrix}. \quad (32)$$

For example, in an embodiment with two bands (e.g., u=0 or 1), without limitation, the prediction weights may be expressed as exponential functions, as in $$w_{i,c}^{u=0} = \exp\left(-\frac{(1-s_{i,c})^2}{h}\right), \quad (33)$$

and $$w_{i,c}^{u=1} = 1 - w_{i,c}^{u=0}$$

where h is a parameter that determines the rate of decay and will be discussed in more detail later on.

Similarly, in an embodiment with three bands, exponential weights may be defined as $$w_{i,c}^{u=0} = \exp\left(-\frac{(1-s_{i,c})^2}{h_{u=0}}\right), \quad (34)$$

$$w_{i,c}^{u=1} = \exp\left(-\frac{(s_{i,c})^2}{h_{u=1}}\right),$$

and $$w_{i,c}^{u=2} = 1 - w_{i,c}^{u=1} - w_{i,c}^{u=0}.$$

In some embodiments the decay rates in each band (e.g., $h_{u=0}$, $h_{u=1}$) may be different and in some embodiments they may be the same.

In an embodiment, all weights across all U bands, add to one, e.g., $$\sum_{u=0}^{U-1} W_c^u = \mathrm{diag}[1, 1, \ldots, 1]$$

Figure 7A:
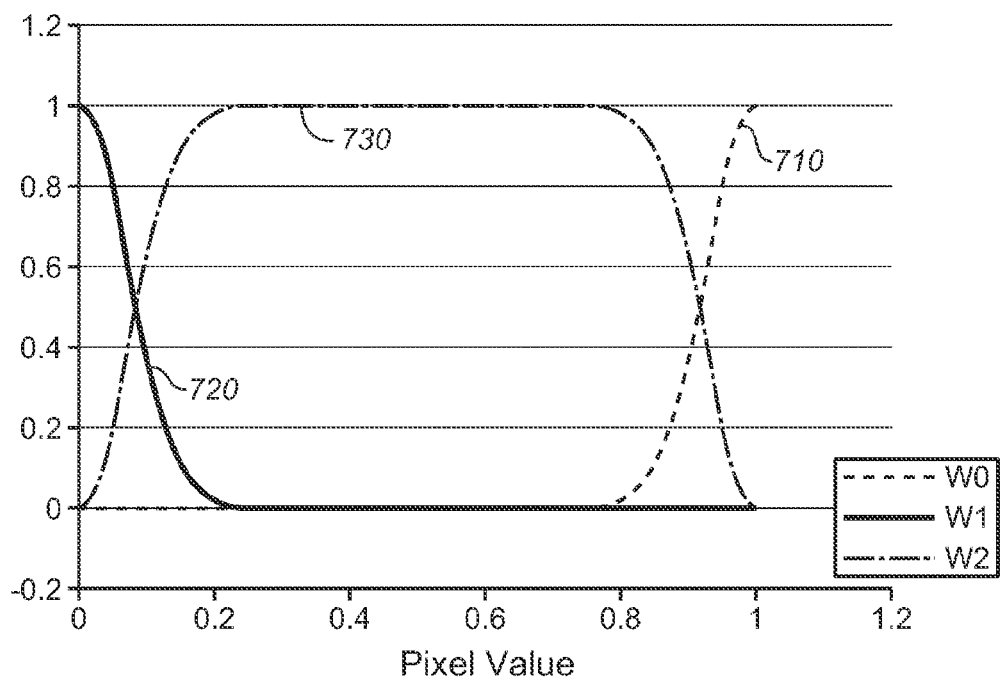
FIG. 7A and FIG. 7B depict example exponential weights according to an embodiment of the present invention.

For U=3, FIG. 7A depicts example plots of the prediction weights described in equation (34) for pixel values normalized to be within the range (0, 1) and h=0.01. As depicted in FIG. 7A, weight $W0=w_{i,c}^{u=0}$ (710) is stronger for pixel values closer to 1 (e.g., the highlights), weight $W1=w_{i,c}^{u=1}$ (720) is stronger for pixels values closer to 0 (e.g., the blacks), and weight $W2=w_{i,c}^{u=2}$ (730) has large values for pixels with medium pixel values (e.g., approximately in the range (0.2, 0.8) (e.g., the mid-tones).

Given weights $w_c^u$, a solution to the band-based prediction model of equation (30) may be derived as $$m_c^u = (S^T W_c^u S)^{-1}(S^T W_c^u v_c). \quad (35)$$

While this solution yields better results than the original piecewise color predictor, one may still observe boundary-related artifacts across band boundaries. To reduce such artifacts, in an embodiment, additional pixel weighting is employed, using a weighted sum of the band-based predicted outputs, as in $$\hat{v}_c = \Sigma_{u=0}^{U-1} W_c^u \hat{v}_c^u. \quad (36)$$

Adaptive Weight Selection

Figure 7B:
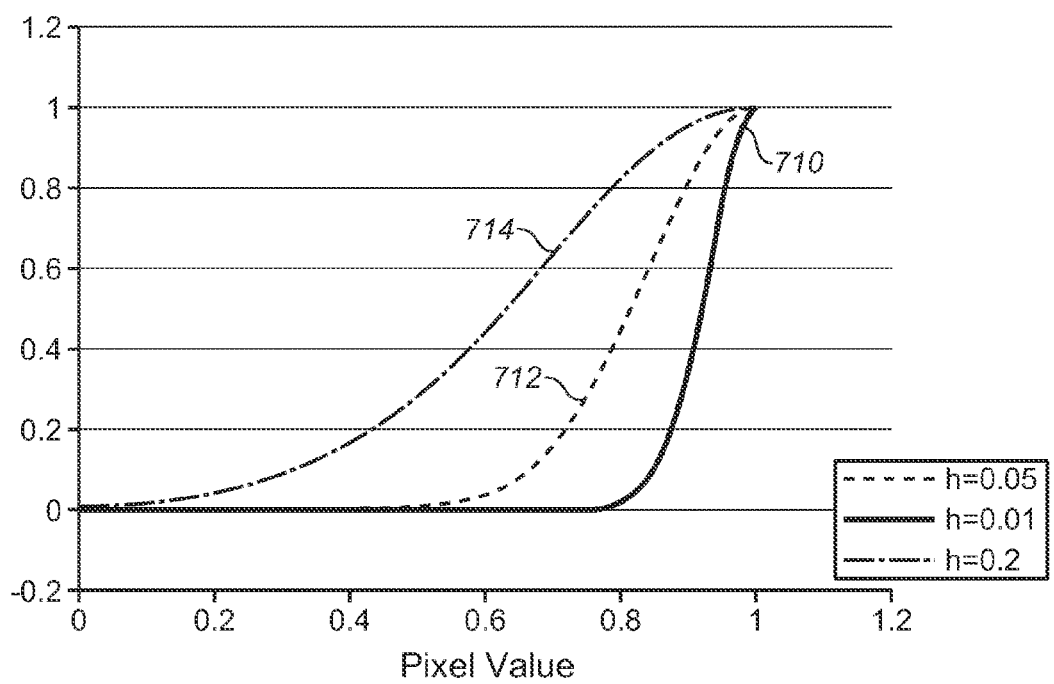

For U=3, FIG. 7B depicts example plots of $W0=w_{i,c}^{u=0}$ for three different values of h:h=0.01 (710), h=0.05 (712), and h=0.2 (714). Applying MLW regression with high values of h corresponds to using a single-band MMR model. On the other hand, a small h leads to sharper decay of the weights and consequently a less smooth transition near the bands. In an embodiment, h (or $h_u$) in each band may be adaptively determined as a function of the SDR signal. For example, in an embodiment, h may be determined as a function of the SDR clipped pixels, as in:

$$h = \alpha \frac{\text{number of SDR clipped pixels}}{P} + h_0, \quad (37)$$

where P represents the total number of pixels in a frame, $h_0$ denotes an initial value (e.g., $h_0$=0.01) and $\alpha$ is a scaling factor (e.g., $\alpha \in (0,1)$). Under this model, when there are few clipped pixels, h is closer to $h_0$, which typically corresponds to images with fewer artifacts. As clipping in the SDR layer increases, h increases as well. In an embodiment, for color RGB SDR pixels, a pixel is considered clipped if bright clipped pixels if $((s_0>T_h)$ or $(s_1>T_h)$ or $(s_2>T_h))$ and $((v_0<T_h)$ or $(v_1<T_h)$ or $(v_2<T_h))$ dark clipped pixels if $((s_0<T_l)$ or $(s_1<T_l)$ or $(s_2<T_l))$ and $((v_0>T_l)$ or $(v_1>T_l)$ or $(v_2>T_l))$ (38)

where $T_h$ and $T_l$ are threshold values that depend on the image bit-depth. In an embodiment with 16-bit images where each color component is normalized to be within the range (0,1), $T_h$=1-2/256 and $T_l$=1-$T_h$. In an embodiment, when using only two bands, in equation (37), only bright clipped pixels are counted. Otherwise, both bright and dark clipped pixels are counted.

Selection of MLW Weights in the YCbCr Domain

Assuming that pixel values in the RGB domain are scaled to be in the range (0, 1), detecting clipped pixel values is relatively simple, for example one may apply the threshold operations of equation (38); however, in practice, all other processing is typically performed in an opponent color space, such as YUV, YCbCr, and the like. Hence, in an embodiment, it is beneficial to determine the weight matrix $W_c^u$ in an opponent color space as well (e.g., YCbCr).

RGB to YCbCr conversion typically requires applying a 3×3 matrix transformation and an offset to the data. Hence, the clipping planes in RGB space may be represented as rotated and tilted planes in YCbCr (or other opponent color). Given the planes R=0, R=1, G=0, G=1, and B=0, B=1, each of these planes can be represented as $$a_1^{j,l} s_{i,0} + a_2^{j,l} s_{i,1} + a_3^{j,l} s_{i,2} = J, \quad (39)$$

where, given YCbCr pixel $s_i$, for j=0, J=1 and l=0, 1, or 2 corresponds to R=1, G=1, or B=1, and for j=1, J=0 and l=0, 1, or 2 corresponds to R=0, G=0, or B=0. Since we have 6 planes and 3 coefficients per plane, the 18 $a_l^{j,l}$ coefficients in equation (39) can be determined from the RGB to YCbCr transformation matrix using either regression analysis or a closed form solution.

Let $d_i^{j=0}$ denote the minimum distance of pixel i to the bright clipping planes (R=G=B=1) and $d_i^{j=1}$ denote the minimum distance of pixel i to the dark clipping planes (R=G=B=0). In an embodiment, their value may be computed as:

$$d_i^{j=0} = \min\{d_i^{j=0(l=0)}, d_i^{j=0(l=1)}, d_i^{j=0(l=2)}\}, \quad (40)$$

$$d_i^{j=1} = \min\{d_i^{j=1(l=0)}, d_i^{j=1(l=1)}, d_i^{j=1(l=2)}\},$$

$$d_i^{j=0(l)} = \frac{|a_1^{j=0(l)}s_{i,0} + a_2^{j=0(l)}s_{i,1} + a_3^{j=0(l)}s_{i,2} - 1|}{\sqrt{a_1^{j=0(l)2} + a_2^{j=0(l)2} + a_3^{j=0(l)2}}},$$

$$d_i^{j=1(l)} = \frac{|a_1^{j=1(l)}s_{i,0} + a_2^{j=1(l)}s_{i,1} + a_3^{j=1(l)}s_{i,2} - 1|}{\sqrt{a_1^{j=1(l)2} + a_2^{j=1(l)2} + a_3^{j=1(l)2}}}.$$

Then the corresponding prediction weights in YCbCr space can be computed as follows: for a two-band predictor $$w_{i,c}^{u=0} = \exp\left(-\frac{(d_i^{j=0})^2}{h}\right), \quad (41)$$

$$w_{i,c}^{u=1} = 1 - w_{i,c}^{u=0},$$

and for a three-band predictor $$w_{i,c}^{u=0} = \exp\left(-\frac{(d_i^{j=0})^2}{h_{u=0}}\right), \quad (42)$$

$$w_{i,c}^{u=1} = \exp\left(-\frac{(d_i^{j=1})^2}{h_{u=1}}\right),$$

$$w_{i,c}^{u=2} = 1 - w_{i,c}^{u=0} - w_{i,c}^{u=1}.$$

Figure 5:
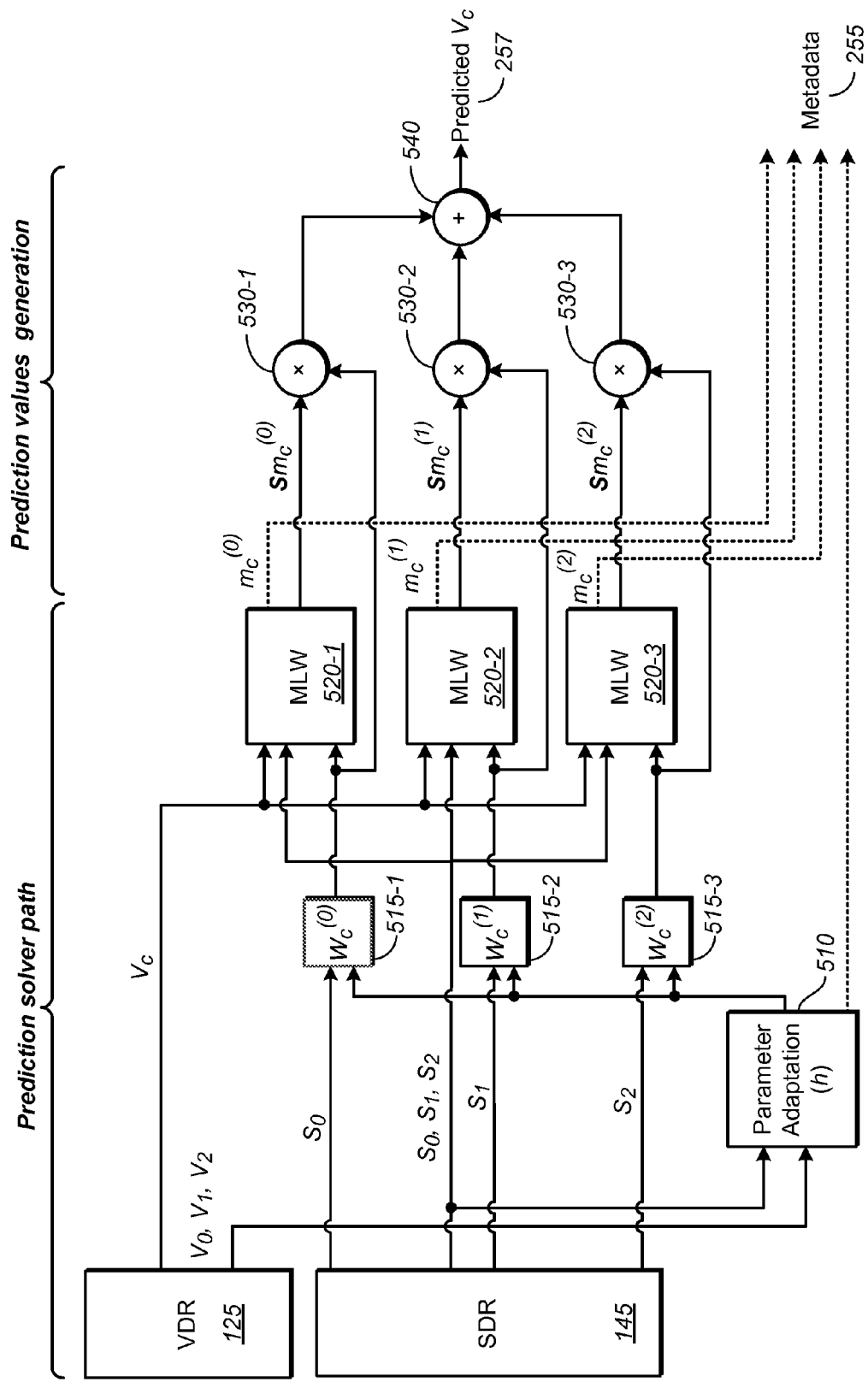
FIG. 5 depicts an example process for Multivariate Locally Weighted (MLW) prediction according to an embodiment of the present invention.

Note that $d_i^j$ values are computed independently of the color component c, hence when operating in an opponent color space only a single set of $w_{i,c}^u$ weights needs to be computed, FIG. 5 depicts an example process for MLW prediction according to an embodiment in an encoder. As depicted in FIG. 5, an encoder (e.g., 100) receives a VDR (125) signal and its corresponding SDR (145) signal. The prediction process (e.g., 250) may be considered to comprise two parts: a) the prediction solver part, which solves for the prediction coefficients according to an MLW model for each of the bands, and b) the final prediction values generator part, which combines the band-based values to generate the final, weighted, prediction values. FIG. 5 depicts a three-band MLW model; however, the process can easily be extended to other multi-band models.

The parameter adaptation step (510), adaptively selects the rate of decay h, according to the inputs (125, 145) and the amount of SDR clipping (e.g., equation (37)). This step is typically computed using input data in the RGB domain. In some embodiment, this step may be skipped by using a fixed h value (e.g., α=0 and h=0.01).

Given h, weight-generators (515) compute the appropriate prediction weights for each color component and for each of the bands (e.g., using equations (42)).

Prediction solvers (520) use the prediction weights, the input prediction model and the input data (S) to generate the prediction coefficients (e.g., using equation (35)). Metadata related to this process (e.g., the number of bands being used, h or the prediction weights $W_c^u$, and prediction model coefficients or parameters $m_c^u$) are also stored and signaled to a downstream decoder as part of the coded bitstream. Given the weights $W_c^u$ and the band-based predicted VDR values ($Sm_c^u$), a final, weighted, predicted VDR output (257) is generated according to equation (36).

Figure 6:
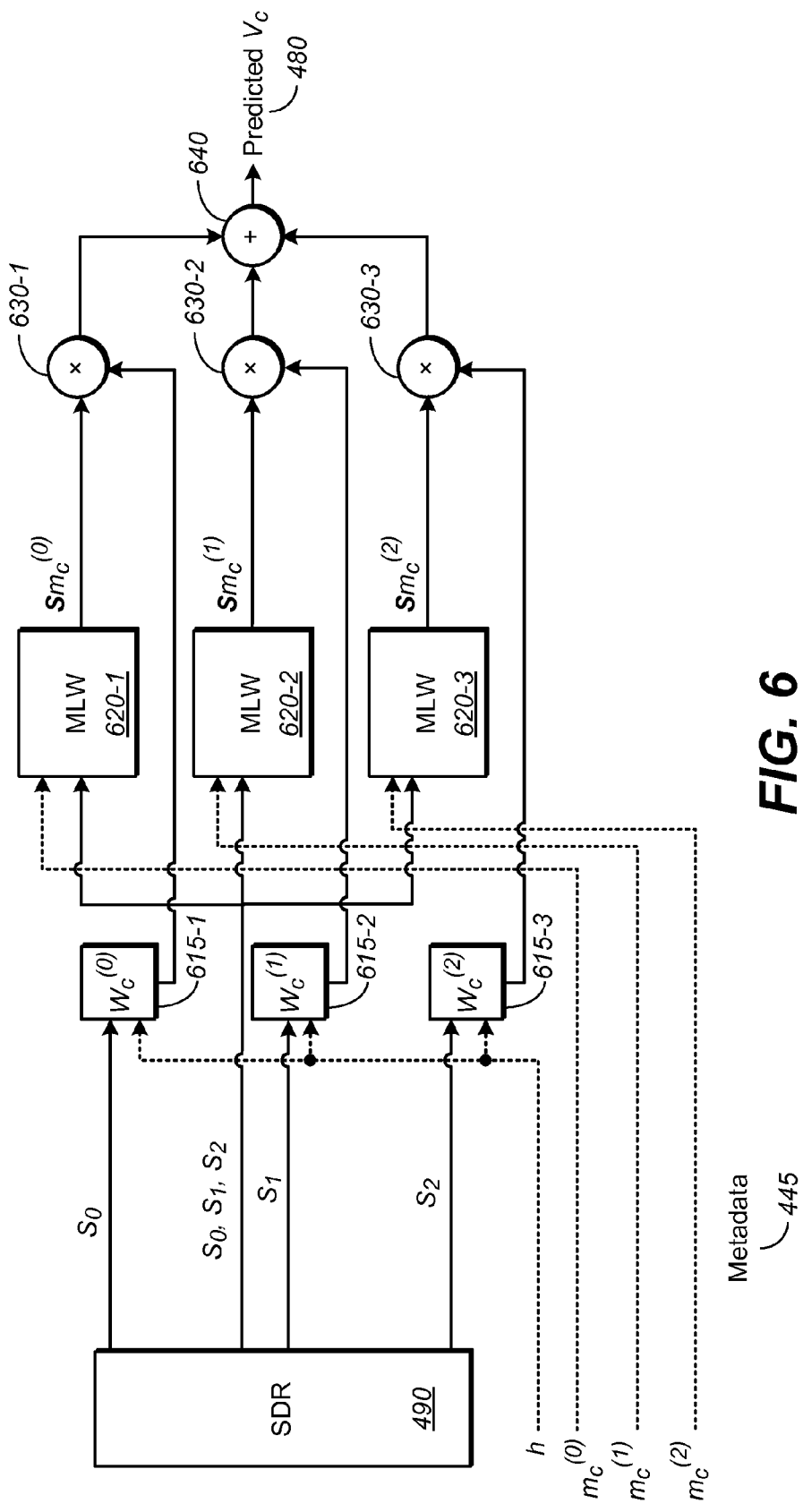
FIG. 6 depicts an example process for decoding a bitstream encoded using MLW prediction according to an embodiment of the present invention.

FIG. 6 depicts an example MLW prediction process (e.g., 450) in a decoder (e.g., 400), according to an embodiment. The process is identical with the prediction value generation path process in the encoder depicted in FIG. 5. Given metadata (255, 445) that include the decay parameter h, weight generators (615) compute the appropriate prediction weights $W_c^u$. These weights, combined with the prediction model parameters $m_c^u$ and the input data S are then used to generate the band-based predicted VDR values $Sm_c^u$ for each of the bands under consideration (e.g., u=0, 1, and 2). Finally, the $Sm_c^u$ values are weighted (630) and added together (640) to generate the predicted VDR output $\hat{v}_c$ (480) according to equation (36).

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control or execute instructions relating to multi-band-based prediction, such as those described herein. The computer and/or IC may compute any of a variety of parameters or values that relate to the multi-band prediction as described herein. The image and video dynamic range extension embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement multi-band-based prediction methods as described above by executing software instructions in a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to applying multi-band prediction in coding VDR and SDR images are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method for inter-layer prediction using a computer, the method comprising:
accessing a first image (145) and a second image (125), each of the images comprising one or more color channels, wherein both images represent the same scene but at a different dynamic range and the second image (125) has a higher dynamic range than the first image (145);
for at least one color channel of the first image:
selecting a multivariate locally weighted (MLW) prediction model using two or more bands;
for each of the two or more bands of the selected MLW model:
computing prediction weights for the band;
solving for prediction parameters for the band and computing a band-based predicted output based on the prediction weights of the band, the first image, the second image, and the MLW prediction model (520); and
generating a final predicted output image based on the prediction weights of all the bands and the band-based predicted outputs (530, 540).

2. The method of claim 1, wherein the prediction weights are based on one or more exponential functions of pixel values in the first image.

3. The methods of claims 2, wherein the prediction weights for identical pixel values for all bands add to one.

4. The method of claim 2, wherein the prediction weights further comprise a positive decay parameter.

5. The method of claim 4, wherein the decay parameter is adapted according to an adaptation function.

6. The method of claim 5 wherein the adaptation function for the decay parameter comprises a function of clipped pixels in the first image.

7. The method of claim 1, further comprising:
compressing the first image into an encoded base layer bitstream; and
compressing an image derived from the second image and the prediction output image into one or more encoded enhancement layer bitstreams.

8. The method of claim 1 wherein the first image comprises a standard dynamic range (SDR) image and the second image comprises a visual dynamic range (VDR) image.

9. The method of claim 4, wherein the prediction parameters of the MLW model and the decay parameter are transmitted to a decoder as metadata.

10. The method of claim 2, wherein for a two-band weighted prediction MLW model the prediction weight functions comprise:

$$w_{i,c}^{u=0} = \exp\left(-\frac{(1-d_i)^2}{h}\right)$$

for a first band and $w_{i,c}^{u=1}=1-w_{i,c}^{u=0}$ for a second band, wherein h denotes a decay parameter and $d_i$ is based on an input image pixel value.

11. The method of claim 2, wherein for a three-band weighted prediction MLW model the prediction weight functions comprise:

$$w_{i,c}^{u=0} = \exp\left(-\frac{(d_i^{j=0})^2}{h_{u=0}}\right)$$

for a first band, $$w_{i,c}^{u=1} = \exp\left(-\frac{(d_i^{j=1})^2}{h_{u=1}}\right)$$

for a second band, and $w_{i,c}^{j=2}=1-w_{i,c}^{u=0}-w_{i,c}^{u=1}$ for a third band, wherein $h_{u=0}$ and $h_{u=1}$ denote decay parameters for the first and the second band, and $d_i^{j=0}$ and $d_i^{j=1}$ are based on input image pixel values.

12. The method of claim 6 wherein the adaptation function comprises $$h = \alpha\frac{N}{P} + h_0$$

wherein $h_0$ denotes an initial decay parameter, P denotes the total number of pixels in the first image, $\alpha$ denotes a scaling factor, and N denotes a number of clipped pixels in the first image.

13. The method of claim 12, wherein a pixel is counted as clipped when at least one of its color components is larger than a first threshold and a corresponding color component of a co-located pixel in the second image is smaller than the first threshold.

14. The method of claim 12, wherein a pixel is counted as clipped when at least one of its color components is lower than a second threshold and a corresponding color component of a co-located pixel in the second image is larger than the second threshold.

15. The method of claim 1, wherein generating a final predicted output image based on the prediction weights and the band-based predicted outputs comprises computing $$\hat{v}_c = \Sigma_{u=0}^{U-1} W_c^u \hat{v}_c^u,$$

wherein $W_c^u$ denotes prediction weights for an u-th band and $\hat{v}_c^u$ denotes a band-based predicted output for the u-th band.

16. The method of claim 15, wherein computing a band-based predicted output $\hat{v}_c^u$ comprises $$\hat{v}_c^u = Sm_c^u,$$

wherein S denotes a matrix of pixel data in the first image based on the prediction model and $m_c^u$ denotes a vector of prediction coefficients for the u-th band.

17. The method of claim 16, wherein computing the prediction coefficients for the u-th band comprises computing $$m_c^u = (S^T W_c^u S)^{-1}(S^T W_c^u v_c),$$

wherein $v_c$ denotes a vector of pixel data based on the second image.

18. An image decoding method comprising:
accessing a first image (490) with a first dynamic range;
for at least one color channel of the first image:
  accessing metadata comprising data for a multivariate locally weighted (MLW) prediction model, the metadata comprising prediction parameters for two or more bands;
  generating prediction weights for the MLW prediction model based on the metadata;
  generating band-based predicted outputs based on the prediction weights and the first image; and
  generating a final output predicted image based on the prediction weights and the band-based predicted outputs.

19. The method of claim 18, further comprising:
accessing a residual image;
combining the residual image and the final output predicted image to generate a second image, wherein the second image has a second dynamic range higher than the first dynamic range.

20. The method of claim 19 wherein the first image comprises an SDR image and the second image comprises a VDR image.

21. A non-transitory computer-readable storage medium having stored thereon computer-executable instruction for executing a method with a computer in accordance with claim 1.

22. A non-transitory computer-readable storage medium having stored thereon computer-executable instruction for executing a method with a computer in accordance with claim 18.

* * * * *